April 20, 1965 J. E. JACKSON 3,179,184
METHOD OF AND APPARATUS FOR AIR-LIQUID DRILLING
Filed Aug. 18, 1961
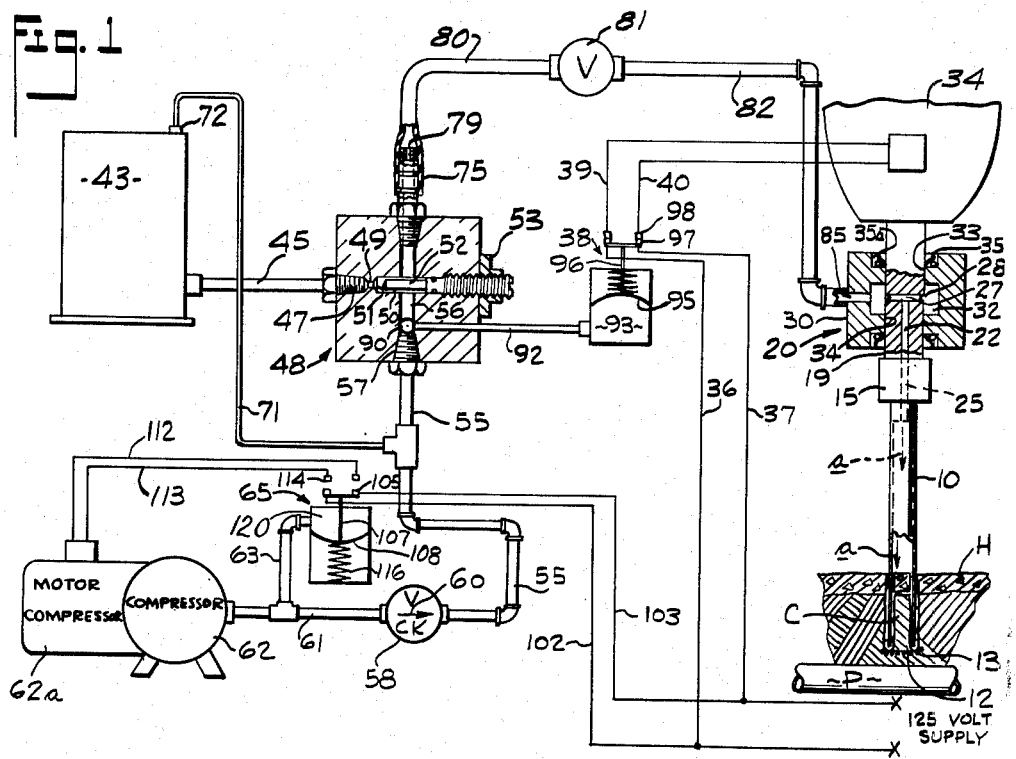
Fig. 1
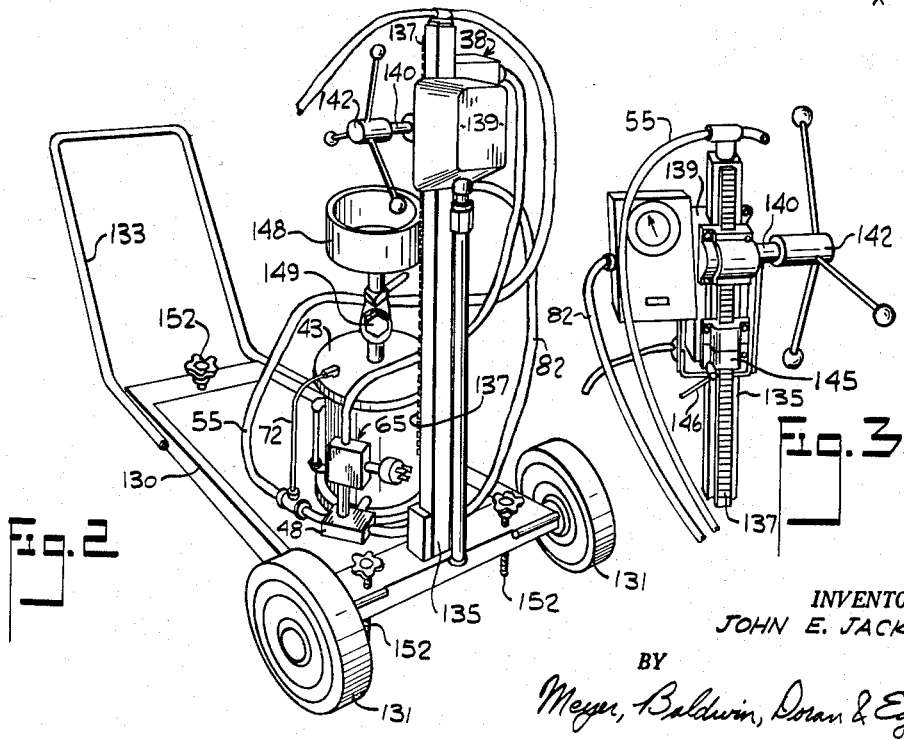
Fig. 2
Fig. 3
INVENTOR.
JOHN E. JACKSON
BY
Meyer, Baldwin, Doran & Egan
ATTORNEYS

United States Patent Office 3,179,184
Patented Apr. 20, 1965

3,179,184
METHOD OF AND APPARATUS FOR
AIR-LIQUID DRILLING
John E. Jackson, 3258 Belvoir Blvd., Beachwood, Ohio
Filed Aug. 18, 1961, Ser. No. 132,417
1 Claim. (Cl. 173—3)

This invention relates to a new and improved method of and apparatus for practicing the said method for use in drilling rigid materials.

More specifically, the novel and improved method and apparatus for practicing the said method of the present invention has particular utility for use in "spudding" fuel distribution systems in which combustible gaseous fuel is distributed underground to various points of utilization.

As will be understood, in such a gaseous fuel distribution system it is desired that periodic inspection of the various distribution lines of said system be understaken so as to detect any leakage of the gaseous fuel therefrom. And, as will be further realized, in metropolitan distribution systems a substantial proportion of the lines of said system are under concrete or like rigid material.

Heretofore, periodic detection has been accomplished by checking the external terminal fixtures or substructures of the system such as vaults, sewers, manholes, water boxes, gas curb boxes and the like whereby easy access to the same is readily accomplished. If any gas leakage is detected at said terminal fixtures excavation of the underground distribution lines connected thereto is next required so as to isolate the source of said gas leakage.

The problem of leakage detection and the correction of the same can therefore be a highly expensive problem when it is realized that in metropolitan areas it is not uncommon to have in the neighborhood of 3,000 miles of distribution lines located under concrete pavement, sidewalk and other like materials.

As will also be recognized, it becomes increasingly necessary to provide periodic detection as the underground fuel system becomes older.

To lessen the cost of detecting gas leakage in such underground systems, "spudding" of the distribution lines of said system, as is referred to in the art, is undertaken so as to provide detection points at predetermined spaced intervals along each distribution line of said system.

As is recognized in the art, "spudding" is accomplished by drilling a hole in the surface material overlying the distribution line at preselected spaced intervals therealong to thereby enable a detection probe of conventional leakage detection equipment to be inserted and lowered into the area adjacent said line to thereby determine if gas is leaking from the same.

In this manner, periodic inspection of and along each distribution line may be undertaken from the surface so as to enable a leakage point in said system to be substantially isolated before any excavation of the line needs to be undertaken.

It is likewise also desirable when "spudding" the distribution line to obtain a sampling of the material overlying the said line so that by analysis it may be determined if the chemical and/or other properties of said material are contributing to said leak or deterioration of said line.

One present day method of "spudding" holes includes the use of air drilling equipment utilizing pneumatic hammers and the like, but this has been found to be highly unsatisfactory since material such as asphalt clogs the drilling apparatus and hence needs substantially constant cleaning.

In addition, the air compressor of said apparatus is a substantial piece of equipment which is difficult to transport especially in congested areas on metropolitan streets and likewise is very noisy which is likewise unsatisfactory in residential areas and particularly so in areas having hospitals located therein.

It is likewise difficult to obtain a suitable sample of the material overlying the distribution line so as to make an accurate analysis of the same.

A primary object of the present invention therefore is to provide a new and improved method of and apparatus for "spudding" underground utility fuel distribution systems.

Another object of the present invention is to provide a novel and improved method of and apparatus for practicing the said method for use in "spudding" underground utility fuel distribution systems and wherein said method is intended to accomplish the acquisition of a sampling of the material overlying the distribution line so that the same may thereafter be available for analysis.

A further object of the present invention is to provide a new and improved method of "spudding" an underground fuel distribution system and which method incorporates abrading peripherally around a material core overlying a distribution line of said system effective to separate said core from said material, and continuously wiping the abrading plane clean of granulated particles or chips of said material by passing a frothy aqueous solution across the abrading plane effective to floatably carry said particles out of the spudding hole thus formed and between the wall of said hole and the aforementioned core to thereby provide a spudding hole that is substantially free of any loose material that could prevent the subsequent insertion of leakage detection probing equipment.

Another object of the present invention is to provide a new and improved method of and apparatus for practicing the said method for use in "spudding" fuel distribution systems located under concrete or like materials, and wherein said apparatus includes drilling means for peripheral abrading effective to separate a material core from said material overlying said system, means for providing a frothy aqueous solution and for passing the same downwardly alongside the periphery of said core and to cause said solution to pass outwardly through and across the abrading plane effective to floatably carry granulated particles upwardly and out of the spudding hole thus formed and between the wall, the latter and said material core, said solution being also effective to maintain said drilling means at a safe drilling temperature.

Additional objects and advantages of the method of and apparatus of the present invention for use in spudding underground gaseous fuel distribution systems will be apparent to one skilled in the art to which it pertains and upon reference to the following disclosure of a preferred method and apparatus for practicing the said invention, and which are illustrated in the accompanying drawings forming a part of this specification, wherein:

FIG. 1 is a schematic diagram showing the structural components of spudding apparatus embodying the present invention and the manner in which the same are interconnected so as to practice the instant spudding method.

FIG. 2 is a front perspective view of a mobile spudding rig mounting the structural components of FIG. 1 thereon; and, FIG. 3 is a fragmentary rear perspective view of the spudding rig of FIG. 2, and showing the adjustable carriage therefor.

With reference now directed to the drawings, the method of the present invention is intended to accomplish the drilling of a "spudding" hole in hard rigid material such as concrete or like material overlying a gaseous fuel distribution system, and to simultaneously provide a sample core of said material for subsequent analysis, and to likewise provide for removing the separated granulated particles of the material from the drilling area and thereby provide a substantially clean spudding hole capable of permitting easy access to the underlying distribution system by suitable leakage detection probing equipment.

More specifically, the drilling method of the present invention incorporates the use of drilling means capable of peripherally abrading around a material core effective to separate the latter from said overlying surface material and to simultaneously direct an aspirated (frothy aqueous fluid) to and across the abrading or cutting plane of the said drilling means so as to floatably carry the separated granular particles of said material away from said plane and upwardly and out of the spudding hole as the same is being formed to thereby continuously wipe said cutting or abrading plane substantially clean of said particles and/or other foreign materials, said drilling means, after penetrating the overlying material, being readily withdrawn so as to carry the sample core of material out of the spudding hole.

It is further intended that said aqueous solution will keep the drilling means at a suitable operating temperature.

As one specific example of drilling apparatus readily adapted to perform the drilling method as above defined, the present invention also relates to a new and improved mobile spudding rig and which is intended to be easily transported to the various spudding points throughout the system to thereby enable substantially greater areas of said system to be "spudded" than heretofore possible.

With reference now directed particularly to FIGS. 1 and 2, the instant spudding method and mobile spudding rig for practicing the said method, preferably incorporates the use of a tubular drill bit 10 having a drilling matrix 12, torus-shaped in configuration, rigidly mounted on its one end, said matrix having a plurality of abrading edges thereon, such as for example diamond whole stones or chips including "man-made" diamonds as are indicated at 13.

The opposite end of said drill bit 10 is seen to mount a hub 15, said hub being securely fastened to the bottom end of stem 19 of coupling member 20.

The stem 19 is seen to be provided with a passage 22 extending longitudinally centrally therethrough communicating at one end with passageway 25 formed in the aforementioned drill hub 15, the latter communicating, in turn, with the interior of the tubular drill bit 10 to thus permit the passage of liquid therethrough, as will later appear in detail. The opposite end of the aforementioned passage 22 is seen to communicate with the inner end of each of a plurality of radially extending ports 27, each of the latter, in turn, connecting at their opposite end with a circumferential groove 28.

Said coupling 20 also includes a collar 30 having a chamber 32 formed centrally therein and which, in turn communicates with bores 33 and 34 formed on opposite ends thereof and through which said stem 19 is projected. Said collar 30 is intended to be stationary relative to the stem 19, and disposed over the latter so that the aforesaid chamber 32 is in communication with the aforesaid stem ports 27.

Suitable packing glands as are indicated at 35 are disposed in recesses 35a on opposite ends of the collar 30 so as to provide a liquid seal to thus retain the liquid solution within the collar chamber 32.

The stem 19 is directly connected or otherwise coupled to a drive motor 34, said motor, in turn, being connected to a suitable source of electrical energy through wires 36, 37, pressure responsive switch 38 and wires 39, 40.

To form a spudding hole, the tubular drill bit 10 is moved into abrading relation with the surface material overlying the distribution line to be exposed, whereupon the matrix 12 of said drill bit initiates the peripheral cutting or abrading of such material to form said spudding hole, the latter being identified in FIG. 1 by the reference character H. At the same time, a sample core of said material as identified at C, immediately overlying an underground line or pipe P is separated and encased within the tubular drill bit 10 so as to be available for subsequent analysis such as for example its conductivity, acidity metallic content, etc.

In this manner therefore, a spudding hole H of any preselected depth may be provided in the material overlying the distribution line so as to enable suitable probing equipment to be lowered therethrough and into proximity with said line to thus detect any leakage of gaseous fuel therefrom.

As is likewise heretofore mentioned, while the spudding hole H is in the process of being formed, the instant spudding method is also intended to provide for the removal of the granulated material particles resulting from said spudding so as to maintain said spudding hole H in a substantially dust free condition.

For this purpose, the mobile embodiment of spudding apparatus disclosed herein includes a reservoir 43 capable of holding preferably at least approximately three gallons of water, and which reservoir is seen to have an outlet conduit 45 in communication therewith adjacent its lower end, and which line connects at its opposite end to an input port 47 formed in a valve block 48.

Said inlet port 47 communicates at its inner end with an orifice 49, the latter at its opposite end connecting with an elongated channel 50 of greater dimension, and which is formed in said valve block 48 in substantial longitudinal prolongation relative to said inlet port 47 and orifice 49, said channel 50 being formed at said connected end with an annular valve seat 51.

A needle valve 52 adjustably mounted at 53 in said valve block 48 is intended to be disposed in variable spaced relation with said valve seat 51, being thus effective therewith to regulate the fluid flow therethrough as will be presently explained in greater detail.

The valve block 48 is also seen to be formed with a passageway 56 extending substantially perpendicular to the aforementioned channel 50 and communicating with the same at approximately its mid point.

A regulated supply of pressurized air is intended to be introduced into passageway 56, and for this purpose, one end of conduit 55 is connected to inlet port 57 communicating with one end of said passageway, the opposite end of said conduit connecting with the outlet end of a conventional check valve 58, the latter permitting a flow therethrough in the direction of the arrow 60. The inlet end of the check valve 58 is serially connected by conducit 61 with the outlet of a conventional air compressor 62. Conduit 63 also connects said compressor outlet in parallel with a pressure controlled electric switch identified in its entirety by the reference numeral 65, the purpose for which will be presently explained.

The air compressor is preferably capable of providing a source of air under a preselected pressure within the range between 2 to 100 pounds per square inch, and which is then directed into the aforesaid valve block passageway 56, through and across the communicating channel 50, being thus effective to cause an aspiration of the liquid out of the reservoir through the aforesaid orifice 49.

As previously mentioned, the instant spudding method incorporates the concept of using a frothy or sudsy aqueous liquid solution to floatably remove the granulated particles and/or chips out of the spudding hole H while it is being formed, and also to maintain the drill matrix 12 at a suitable operating temperature. It has been determined that by the use of such an aqueous solution in the instant spudding method highly satisfactory results are obtained with a very small quantity of liquid. By way of example, it has been found that to "spud" twenty holes each one inch in diameter in concrete material of approximately fourteen inches in thickness, which is considered common in metropolitan areas, it is estimated that approximately two hundred gallons of water or like liquid would be needed to adequately remove the granulated particles or chips from said holes, whereas by using a frothy, sudsy liquid solution such as is incorporated in the instant spudding method, only approximately three gallons of liquid solution or less than 2% as much is actually needed.

This sudsy solution, while acting as a coolant to keep the drill matrix at a suitable operating temperature, also provides a thin "oily" film for the inside and outside surfaces of said drill bit and in addition acts as a lubricant to reduce and/or prevent the roadway material from sticking to said surfaces. Furthermore, said "oily" film prevents any tar or asphaltic compound material of said roadway material from adhering to said drill bit surfaces.

To provide for said frothy solution, a suitable liquid detergent is added to the water in the reservoir 43, one such detergent preferred for use being referred to under its commercial name of "Joy." It is likewise determined to mix said water and detergent (Joy) in the reservoir at the ratio of approximately 130 parts water to approximately 1 part detergent.

With this mixture, the pressurized air moving across the channel 50 causes an aspiration of said fluid through the orifice 49 to thereby provide a frothy, sudsy solution consisting predominantly of bubbles of entrapped air.

Conduit 71 connecting with the conduit 55 on the inlet side of the valve block passageway 56 also connects at 72 with the upper end of the reservoir 43 being thus effective to maintain or equalize the interior of said reservoir above the liquid level at the same pressure as the inlet side of said valve block to thereby provide for maximum aspirating efficiency and also to prevent a vacuum lock from developing in the outlet reservoir conduit 45.

A restrictor member 75 connects with the outlet end of the valve block passageway 56, said member defining a restricting orifice 79 which functions to control the aspirated fluid flow therethrough so as to maintain the pressure of said aspirated frothy solution at a predetermined pressure. For example it has been determined that when using a drill bit 10 of 1" diameter it is preferred to maintain said pressure at approximately 30 lbs. per square inch, and that when said drill diameter is increased or decreased, said pressure likewise should be increased or decreased accordingly.

A suitable flexible conduit 80 connects with the restrictor member 75 and to the inlet end of a conventional shutoff valve 81, the latter connecting at its outlet end through conduit 82 to an inlet port 85 on the collar 30 of drill coupling member 20. Inlet port 85 communicates, in turn, with the aforementioned chamber 32.

With this assembly, it will be seen that as the frothy aqueous water-detergent solution enters into the stationary collar 30, it passes through the aforesaid chamber 32, into and through the ports 28 and thence downwardly through the passage 22 and into the interior of the tubular drill 10. Said stream then travels downwardly through said drill bit 10 in the direction of the arrows $a$ and between the inside surface of the wall of said drill and the material core C, thence outwardly, underneath and around the matrix 12 so as to wipe across the abrading plane whereby the separated granular particles or chips are literally buoyed up by the bubbles of entrapped air and floated upwardly between the outside surface of the drill and the wall of the spudding hole H and thereby out of said spudding hole.

As will likewise be apparent, as the said water-detergent solution wipes across the aforesaid abrading plane, it thereby keeps the drill matrix 12 at a suitable operating temperature.

To protect the drill matrix 12 from being damaged in the event the water-detergent solution becomes exhausted, or in the event the compressor 62 fails to operate, the valve block 48 is preferably provided with a port 90 communicating on its one end with the aforementioned valve block passageway 56 and on its opposite end with one end of conduit 92. The opposite end of said conduit 92 communicates with the pressure chamber 93 of the aforementioned pressure responsive switch 38. As seen in FIG. 1, said switch is somewhat conventional in design having a flexible diaphragm 95 mounting an armature 96, the latter carrying contacts 97 for engagement with fixed contacts 98. Contacts 97 are seen to connect with line conductors 36 and 37, whereas contacts 98 connect with motor conductors 39 and 40.

In operation, with the pressure in valve block passageway 56 being maintained at its proper level, said pressure is likewise experienced in pressure chamber 93 of the switch 38. Under this condition, the diaphragm 95 is forced upwardly effective to close contacts 97 and 98 and connect the drill motor 34 to the electrical power source. And, that upon the outlet pressure of the compressor 62 reaching a predetermined magnitude, said pressure being also applied through conduit 63 to the pressure chamber 120 of switch 65, the switch diaphragm 108 will be forced downwardly as viewed in FIG. 1, so as to open the switch contacts and disconnect said compressor motor.

With reference now directed to FIGS. 2 and 3, the mobile spudding rig of the present invention as is herein shown, includes a platform 130 preferably rectangular in configuration and rotatably mounting wheels 131 on its one end. A handle 133 attached to the opposite end of said platform 130 enables the same to be freely manually manipulated to the "spudding" area.

An upright mast 135 is securely attached to the platform 130 and in its present form is seen to be provided with a rack 137 extending longitudinally therealong.

The drill motor 34 and attached drill bit 10 are mounted on a carriage 139, the latter being slidable along the aforesaid upright mast 135. A suitable pinion (not shown) mounted on one end of shaft 140, the latter being attached, in turn, to said carriage, is intended to mesh with said rack 137. Handle 142 carried on the opposite end of shaft 140 provides for rotating said shaft and pinion to thereby adjustably position said carriage along said rack.

Locking bracket 145 mounted on said carriage 139 and embracing said rack 137 is intended to be moved by lock screw 146 into locking engagement with the rack to thereby retain said carriage in any selected adjusted position.

The reservoir 43 is preferably mounted on the platform 130 rearwardly of the mast 135 and has an open funnel 148 connected to its upper end to enable it to be readily refilled. If desired, a conventional shut-off valve 149 may be interposed between the funnel 148 and said reservoir to thereby control the flow of fluid therebetween.

Leveling jacks 152 adjustably mounted on the platform 130 enable the mast 135 and drill rig carried thereon to be adjusted relative to the surface to be spudded.

Although not herein shown, the motor and compressor therefor is preferably carried on a separate platform. However, if desired, said units may be mounted on the platform 130.

With this assembly, it will now be realized that the mobile spudding rig as just described may be readily moved successively to predetermined spaced "spudding" points along the fuel distribution system, whereafter the spudding hole H may be easily formed.

It will further be realized that the instant spudding method enables the rapid and relatively quiet formation of a spudding hole than heretofore possible to obtain, and likewise one which is substantially free of chips and/or granulated material.

Having thus described our invention it will be realized that the same is susceptible to various modifications, changes and combinations of parts without departing from the inventive concepts thereof as are defined in the claim.

What is claimed is:

Portable drilling apparatus for spudding holes in concrete and like materials, comprising a vehicular platform, a mast carried on said platform, a tubular drill bit, carriage means rotatably mounting said bit in an elevated plane on said mast, means for rotatably driving said bit, rack and pinion means interconnecting said mast and carriage means and operable to enable the latter to be adjustably positioned on said mast effective to carry said drill bit into abrading relation with said material, said drill bit being rotatably driven so as to peripherally abrade a material core and separate the same from said material, a reservoir containing an aqueous solution, means for aspirating said solution effective to provide a stream composed predominantly of bubbles of entrapped air, including a valve block having a chamber formed therein; first conduit means connecting said reservoir to said chamber, a source of pressurized fluid and second conduit means for connecting said pressurized fluid source directly to said chamber effective to provide a continuous flow of said pressurized fluid into said chamber, valve means in said chamber being adjustable for regulating the quantity of said aqueous solution and pressurized fluid passing through said chamber effective to cause an aspiration of said solution, third conduit means connecting with said valve block and the interior of said tubular drill bit for enabling said stream to pass downwardly through said bit and outwardly across the abrading plane thereof to floatably carry separated particles of said material upwardly out of said hole, means defining a restrictor orifice connected between said valve block and said third conduit means for maintaining the pressure of the aspirated stream at a predetermined pressure, fourth conduit means connected between said second conduit means and said reservoir effective to expose said reservoir to the pressure of said pressurized fluid, first control valve means connected between said chamber and said driving means for said bit being actuated in response to a predetermined decrease in fluid pressure in said chamber to interrupt said driving means and stop said bit, second control valve means connected between said second conduit means and said source of pressurized fluid being actuated in response to a predetermined decrease in fluid pressure in said second conduit means to energize said source of fluid pressure being thus effective to maintain a continuous flow of said pressurized fluid into said chamber.

References Cited by the Examiner

UNITED STATES PATENTS

| | | | |
|---|---|---|---|
| 704,158 | 7/02 | Whitehead | 173—63 |
| 739,551 | 9/03 | Leyner | 173—61 |
| 837,347 | 12/06 | Smith | 173—61 |
| 887,801 | 5/08 | Hellman et al. | 173—63 |
| 1,850,143 | 3/32 | Schurmeyer | 175—69 |
| 2,009,066 | 7/35 | Mitchell | 173—61 |
| 2,084,686 | 6/37 | Howard | 173—23 |
| 2,310,001 | 2/43 | Haddock | 175—205 |
| 2,348,024 | 5/44 | Parrish | 173—23 |
| 2,843,361 | 7/58 | Miller | 173—3 |
| 2,870,994 | 1/59 | Klapka | 173—57 |
| 2,953,659 | 9/60 | Edwards | 200—81.9 |
| 2,995,515 | 8/61 | Bobo | 175—69 |
| 3,003,493 | 10/61 | Miller | 173—57 |
| 3,005,888 | 10/61 | Putz | 200—83 |

FOREIGN PATENTS 620,612  3/49  Great Britain.

BROUGHTON G. DURHAM, *Primary Examiner.*

BENJAMIN BENDETT, *Examiner.*